Figure 1:
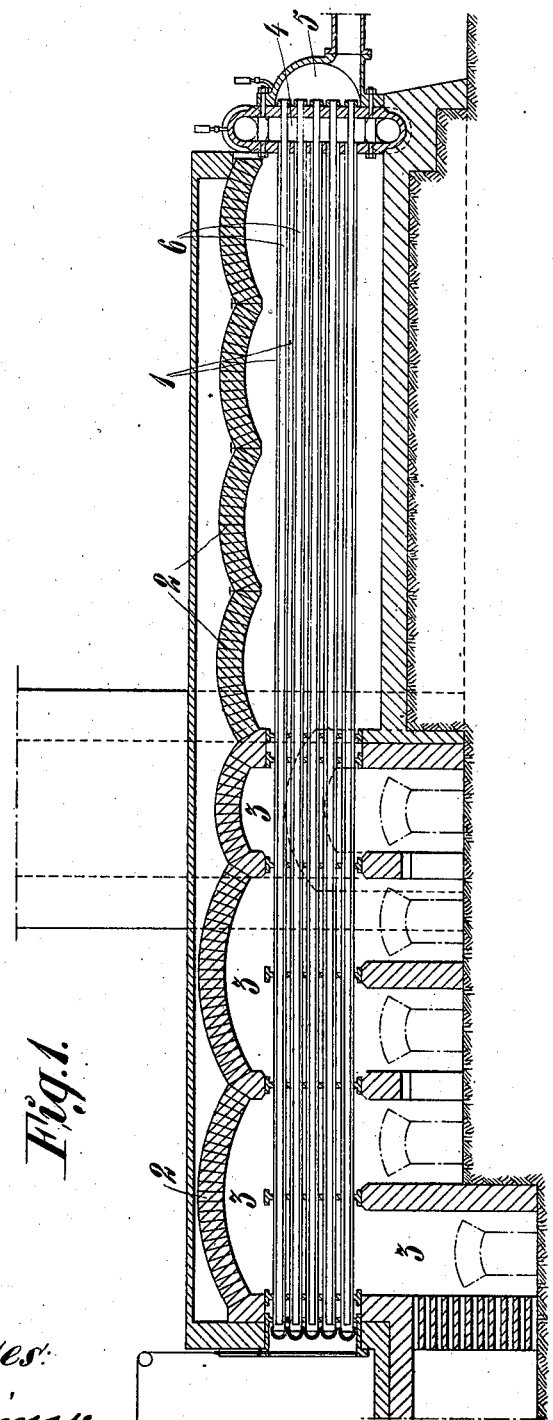

No. 847,748. PATENTED MAR. 19, 1907.
M. EKENBERG.
PROCESS FOR CHARRING OR CARBONIZING PEAT.
APPLICATION FILED MAY 14, 1903.

2 SHEETS—SHEET 1.

Witnesses:

Inventor:
Martin Ekenberg

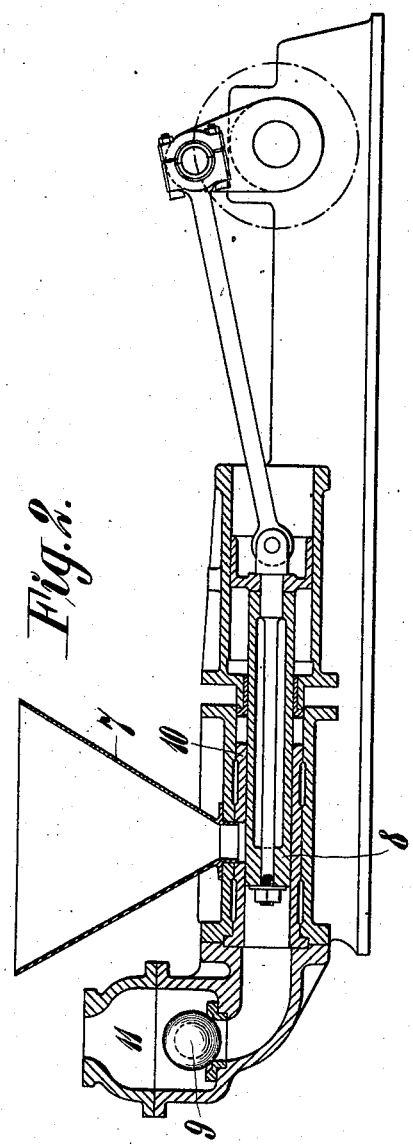

UNITED STATES PATENT OFFICE.

MARTIN EKENBERG, OF STOCKHOLM, SWEDEN.

PROCESS FOR CHARRING OR CARBONIZING PEAT.

No. 847,748.

Specification of Letters Patent.

Patented March 19, 1907.

Application filed May 14, 1903. Serial No. 157,177.

*To all whom it may concern:*

Be it known that I, MARTIN EKENBERG, a subject of the King of Sweden, residing at Stockholm, Sweden, have invented a new and useful Process of Treating Peat and other Substances, of which the following is a specification.

This invention relates to methods of treating peat, waste wood, and other substances of a similar nature.

For the purpose of facilitating a clear understanding of my invention I will refer briefly to certain characteristics of peat and similar substances. It is well known that peat as it comes from the bog contains a large quantity of water. If the peat be air-dried in the well-known manner or if it be pressed, a portion, but not all, of this water can be removed from the peat. The reason why all the water cannot be removed from the peat by air-drying or pressing seems to be that the peat contains minute chambers or so-called "vesicles" which are filled with water, and in compressing or air-drying the peat the water in the vesicles is not removed, although practically all the water outside the vesicles is expelled. In this specification I shall refer to the water which is contained in the vesicles—that is, the water which cannot be removed from the peat or other substance by air-drying or pressing—as "vesicular" water, and I shall refer to the water which can be expelled by pressing or air-drying as "mechanically-suspended" water.

Prior to my invention, so far as I am aware, it was considered necessary in the treatment of peat first to remove all or practically all of the mechanically-suspended water, either by air-drying, pressing, or by some equivalent operation, before attempting to carbonize or char the peat—that is, to place it in condition to be burned as fuel. After removing the mechanically-suspended water the peat or other substance was heated in a suitable apparatus, either by means of external heat or by heated gases or steam or electricity, in a manner analogous to or resembling dry distillation, by means of which heating the vesicular water remaining in the peat, together with certain volatile products, were driven off as vapor or gas. These prior processes were expensive on account of the time required by air-drying or the labor and power required in pressing and by the excessive heat necessary to maintain the apparatus at the proper temperature during the carbonizing operation, especially when hot gases were used. Furthermore, the prior processes were objectionable by reason of the fact that excessive heat frequently caused the accidental ignition of the peat while in the so-called "charring" or "carbonizing" apparatus.

My present process is based on my discovery that if precautions be taken to prevent vaporization of water the peat or other substance can be thoroughly carbonized or rendered capable of use as fuel without making any effort to remove the mechanically-suspended water prior to the heating operation and that after the heating operation has been concluded both the mechanically-suspended water and the vesicular water can be readily separated from the peat in any well-known manner—such, for example, as by permitting the peat to settle in the water. Furthermore, I have discovered that the presence of the mechanically-suspended water so far from being detrimental during the heating operation, as formerly believed, is advantageous for two reasons: first, because it acts as an excellent heat-conductor for transmitting heat uniformly to all portions of the peat, and, second, because it prevents accidental ignition of the peat or other substance during the carbonizing or heating operation.

In this specification I do not desire to be limited to any technical definition of the expression "carbonization" or "carbonized peat." By the word "carbonization" I mean the change which takes place in the peat as the result of treatment according to my process and which enables the peat to be burned as fuel, and by "carbonized peat" I mean peat which has been rendered capable of ignition by treatment according to my process.

My new process consists in taking peat practically as it comes from the bog—that is, peat containing practically the normal quantity of mechanically-suspended water in addition to the vesicular water—and, without making any effort to remove the mechanically-suspended water, heating the mixture of peat and water in a suitable apparatus or vessel in such manner that none of the water can evaporate. The vessel or a part thereof is preferably heated to a temperature ranging from 150° centigrade to 250° centigrade or higher, according to the kind of peat, for a period ranging from ten to forty minutes.

The temperature to be used and the duration of the process depend upon the material to be treated and can be exactly ascertained only by experience. For instance, mosses of the kind called "*Sphagnum*" should be exposed for ten minutes to a temperature of 150° centigrade. Younger turf is suitably exposed for twenty-five minutes to a temperature of 250° centigrade, and older turf is preferably exposed for forty minutes to a temperature of 250° centigrade. Consequently in opposition to hitherto-known methods a treatment of the peat exclusively in the presence of the mechanically-suspended water takes place without any water being allowed to escape in the form of steam. The mechanically-suspended water present during the heating operation plays an important part, as it is an excellent heat-conductor and serves to impart heat rapidly and uniformly from the walls of the closed vessel or chamber to each particle of peat—an effect which cannot be obtained with the aid of gases or vapors—at the same time preventing accidental ignition of the peat. Furthermore, an important economical effect results from avoiding evaporation of the water, as evaporating water requires a considerable amount of heat and is to be avoided, since the heat used for this purpose cannot be recovered. According to my method no heat is wasted in evaporating water.

The efficiency of the present new process seems to be largely due to the fact that the heat which is uniformly transmitted by the mechanically-suspended water to all parts of the peat, as before described, causes the so-called "vesicles" to be changed, broken up, or destroyed, so that they are caused to liberate the vesicular water which they normally contain, this operation of causing the vesicles to liberate the vesicular water being aided by the extreme pressure under which the process is carried out. The principal difference between the present method and the old methods, therefore, is that when the peat is pressed or otherwise treated according to the old methods to expel preliminarily the mechanically-suspended water the vesicles are not destroyed, and the considerable quantity of water which they contain is retained in the peat until it is subsequently heated in the manner previously described with reference to prior processes to destroy the vesicles and expel the water as vapor, with the accompanying risk of igniting the peat. In my process, on the contrary, instead of expelling the mechanically-suspended water I utilize it as a heat-conductor for uniformly heating the peat and releasing the vesicular water, at the same time preventing accidental ignition, whereby constant watchfulness of an attendant to prevent the temperature of the heat from rising to the point of ignition is unnecessary.

My process may be carried out in any suitable apparatus; but in order that the practical working of the invention may be better understood an apparatus well adapted for the purpose is shown in the accompanying drawing, in which—

Figure 1 shows the heating apparatus in longitudinal vertical section, and Fig. 2 shows in longitudinal vertical section a pulp-pump for feeding the wet or raw peat into the receiving-chamber of the heating apparatus.

1 designates a plurality of horizontally-disposed metal tubes placed within a brickwork structure 2, having at one end a fireplace or furnace 3. The tubes 1 are open toward the feeding-chamber 4 of the apparatus, but closed at their opposite ends. Extending through the tubes 1 from the chamber 5, leading to a receptacle under pressure or to a press for separating the water from the treated or carbonized product, are a number of inner tubes 6, one within each of the outer ones, said inner tubes extending to within a short distance from the closed ends of the outer tubes. The wet peat is placed in a hopper 7, Fig. 2, from which it is intermittently pumped or forced into the heating apparatus by means of a plunger or piston 8, driven in any suitable manner. The plunger or piston forces the wet peat to pass a valve, suitably consisting of a hollow metal ball 9. From the chamber 11 above the valve 9 the raw peat is brought to a chamber 4, Fig. 1, at one end of the heating apparatus and caused to enter the spaces between the outer and inner tubes 1 and 6. At the closed ends of the outer tubes 1 the material is caused to turn and move through the inner tubes in a direction opposite to the direction of movement of the material in the spaces between the outer and inner tubes. The material after having been heated in the furnace 3 is caused during its passage through the portion of the inner tubes extending through the right half of the heating apparatus to give off heat to the material moving toward the furnace and finally reaches the chamber 5, from which it is led to the receptacle referred to above for separating the water from the treated product.

What I claim is—

1. The herein-described process of treating a substance which contains mechanically-suspended water and vesicular water, which process consists in subjecting the substance and water to a temperature sufficient to liberate the vesicular water, without permitting either the vesicular or mechanically-suspended water to evaporate during the heating operation, whereby the mechanically-suspended water acts as a heat-conductor during the heating operation for causing the liberation of the vesicular water.

2. The herein-described process for treating peat, and other substances which contain mechanically-suspended and vesicular water, which process consists in subjecting the peat and water to a temperature of not less than 150° centigrade for a period ranging from ten to forty minutes without permitting any water to evaporate, and finally separating the peat from the water, the mechanically-suspended water serving as a heat-conductor during the heating operation to liberate the vesicular water and to prevent ignition of the peat.

3. The herein-described process of carbonization, which consists in heating the substance to be treated in the presence of a liquid, such as water, without permitting any of the liquid to evaporate during the heating operation, whereby the liquid acts as a heat-conductor for transmitting heat to the substance to be treated.

In witness whereof I have hereunto signed my name in the presence of two subscribing witnesses.

MARTIN EKENBERG.

Witnesses:
 ERNST SVANQVIST,
 ROBERT APELGREN.